(12) United States Patent
Porubanova

(10) Patent No.: US 12,154,247 B1
(45) Date of Patent: Nov. 26, 2024

(54) BINOCULAR DISPLAY MISALIGNMENT CORRECTION

(71) Applicant: Microsoft Technology Licensing, LLC, Redmond, WA (US)

(72) Inventor: Michaela Porubanova, Seattle, WA (US)

(*) Notice: Subject to any disclaimer, the term of this patent is extended or adjusted under 35 U.S.C. 154(b) by 0 days.

(21) Appl. No.: 18/210,576

(22) Filed: Jun. 15, 2023

(51) Int. Cl.
*G06T 3/14* (2024.01)
*G06F 3/01* (2006.01)
*G06T 3/20* (2006.01)
*G06T 7/20* (2017.01)
*G06T 7/30* (2017.01)

(52) U.S. Cl.
CPC .............. *G06T 3/14* (2024.01); *G06F 3/011* (2013.01); *G06T 3/20* (2013.01); *G06T 7/20* (2013.01); *G06T 7/30* (2017.01)

(58) Field of Classification Search
CPC .... G06T 3/14; G06T 7/30; G06T 3/20; G06T 7/20; G06F 3/011
See application file for complete search history.

(56) References Cited

U.S. PATENT DOCUMENTS

| | | | |
|---|---|---|---|
| 2008/0084472 A1 | 4/2008 | Trudeau et al. | |
| 2016/0349510 A1 | 12/2016 | Miller | |
| 2016/0349837 A1 | 12/2016 | Miller | |
| 2017/0309071 A1* | 10/2017 | Benko | G06T 19/006 |
| 2018/0053284 A1 | 2/2018 | Rodriguez et al. | |
| 2019/0238818 A1* | 8/2019 | Held | H04N 13/139 |
| 2019/0295323 A1* | 9/2019 | Gutierrez | G02B 27/017 |
| 2021/0160440 A1 | 5/2021 | Bleyer et al. | |

OTHER PUBLICATIONS

U.S. Appl. No. 18/210,572, filed Jun. 15, 2023.
U.S. Appl. No. 18/210,577, filed Jun. 15, 2023.
U.S. Appl. No. 18/210,578, filed Jun. 15, 2023.
U.S. Appl. No. 18/651,406, filed Apr. 30, 2024.
Notice of Allowance mailed on Apr. 5, 2024, in U.S. Appl. No. 18/210,578, 9 pages.
International Search Report and Written Opinion received for PCT Application No. PCT/US2024/034227, Aug. 30, 2024, 14 pages.
International Search Report and Written Opinion received for PCT Application No. PCT/US2024/033186, Sep. 12, 2024, 15 pages.

* cited by examiner

*Primary Examiner* — Lixi C Simpson
(74) *Attorney, Agent, or Firm* — Workman Nydegger

(57) ABSTRACT

Techniques for triggering a correction to a binocular image misalignment in an ER system are disclosed. Triggering this correction is based on detected activity in a scene in which the ER system is operating. A first hologram is displayed. User activity is detected, but this activity is below a threshold level. A first correction algorithm is selected and is designed to achieve uninterrupted performance with respect to the first hologram. The first correction algorithm is triggered, resulting in correction of binocular image misalignment. Subsequently, second user activity is detected. This second user activity is associated with a second hologram. A second correction algorithm is selected and is designed to achieve accurate performance with respect to the second hologram. The second correction algorithm is executed, resulting in correction of the binocular image misalignment.

20 Claims, 12 Drawing Sheets

BINOCULAR DISPLAY MISALIGNMENT CORRECTION

BACKGROUND

The phrase "extended reality" (ER) is an umbrella term that collectively describes various different types of immersive platforms. Such immersive platforms include virtual reality (VR) platforms, mixed reality (MR) platforms, and augmented reality (AR) platforms.

For reference, conventional VR systems create completely immersive experiences by restricting their users' views to only virtual environments. This is often achieved through the use of a head mounted device (HMD) that completely blocks any view of the real world. With this HMD, a user can be entirely or partially immersed within an immersive environment. Conventional AR systems create an augmented reality experience by visually presenting virtual objects that are placed in the real world. Conventional MR systems also create an augmented reality experience by visually presenting virtual objects that are placed in the real world. In the context of an MR system, those virtual objects are typically able to be interacted with by the user, and those virtual objects can interact with real world objects. AR and MR platforms can also be implemented using an HMD.

Unless stated otherwise, the descriptions herein apply equally to all types of ER systems, which include MR systems, VR systems, AR systems, and/or any other similar system capable of displaying virtual content. An ER system can be used to display various different types of information to a user. Some of that information is displayed in the form of a "hologram." As used herein, the term "hologram" generally refers to virtual image content that is displayed by an ER system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. Other holograms can be locked to a particular position in the user's field of view (FOV). In any event, ER systems are able to generate numerous different types of holograms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for triggering execution of a correction algorithm designed to achieve accurate performance with respect to a hologram by correcting misalignment in images of an extended reality (ER) system, where said triggering is based on detected activity in a scene in which the ER system is operating, said method including: detecting a user activity in the scene, wherein the user activity is performed by a user wearing the ER system; determining that the user activity is associated with the hologram in the scene; selecting the correction algorithm designed to achieve accurate performance with respect to the hologram by correcting one or more of a horizontal image misalignment or a vertical angular image misalignment in the images generated by the ER system; and triggering execution of the correction algorithm, resulting in corrections to the one or more of the horizontal image misalignment or the vertical angular image misalignment in a manner so as to achieve accurate performance with respect to the hologram.

In some aspects, the techniques described herein relate to an extended reality (ER) system that triggers execution of a correction algorithm designed to achieve uninterrupted performance with respect to a hologram by correcting a binocular image misalignment in the ER system, said ER system including: a processor system; and a storage system that stores instructions that are executable by the processor system to cause the ER system to: determine that an amount of user activity in a scene in which the ER system is operating is below a threshold level of activity; select the correction algorithm designed to achieve uninterrupted performance with respect to the hologram by correcting the binocular image misalignment in images generated by the ER system; and trigger execution of the correction algorithm, resulting in corrections to the binocular image misalignment in a manner so as to achieve uninterrupted performance with respect to the hologram.

In some aspects, the techniques described herein relate to a method for triggering a correction to a binocular image misalignment in an extended reality (ER) system, said method including: displaying a first hologram in the scene; determining that a detected level of first user activity in the scene is below a threshold level, wherein the first user activity is performed by a user wearing the ER system; selecting a first correction algorithm designed to achieve uninterrupted performance with respect to the first hologram, the first correction algorithm being further designed to correct the binocular image misalignment; triggering execution of the first correction algorithm, resulting in correction of the binocular image misalignment; subsequently, detecting second user activity in the scene; determining that the second user activity is associated with a second hologram in the scene; based on said determination that the second user activity is associated with the second hologram, selecting a second correction algorithm designed to achieve accurate performance with respect to the second hologram, the second correction algorithm being further designed to correct the binocular image misalignment; and triggering execution of the second correction algorithm, resulting in correction of the binocular image misalignment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
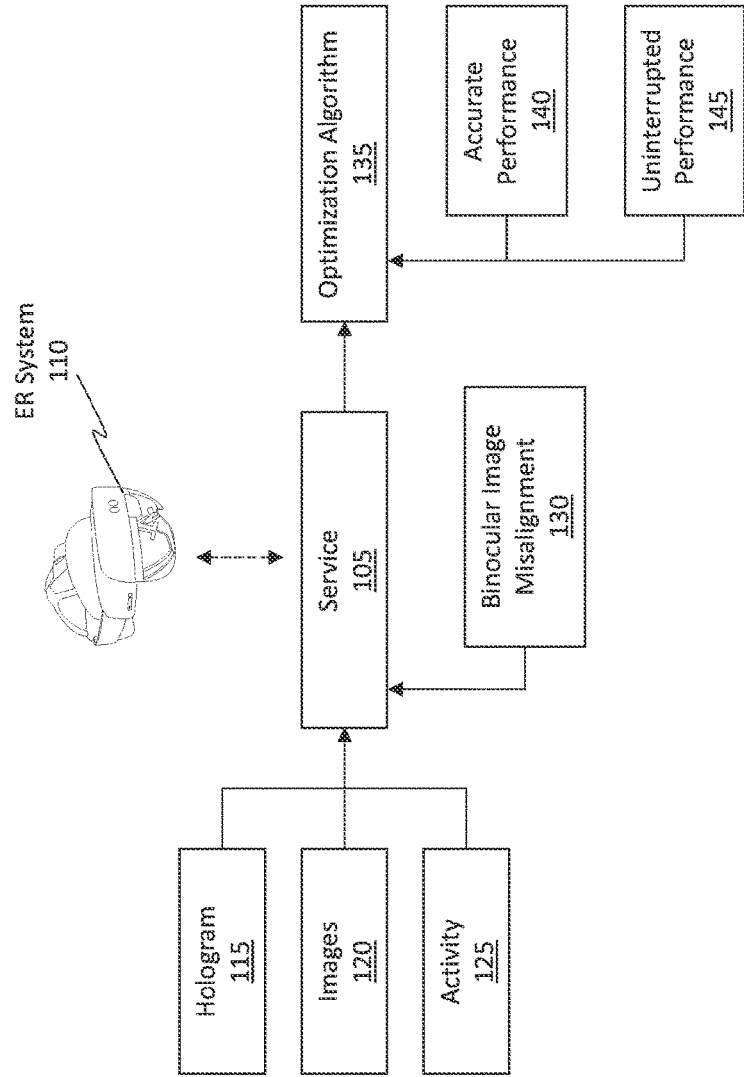
FIG. 1 illustrates an example architecture that can trigger an optimization routine to correct for potential image misalignments.

Display misalignment is one of the most pernicious issues in ER displays because it compromises the user's visual comfort and visual performance. In addition to discomfort, this misalignment often results in hologram misplacement in the visual field. Thus, correcting binocular display misalignment is desirable to build comfortable and quality ER experiences.

Some ER devices are able to correct binocular display misalignments while operating in the field using sensors such as inertial measurement units (IMUs). For example, an IMU can be disposed on a nose bridge or display bridge of the ER system's HMD. While at this position, the IMU can detect the amount of misalignment that may occur by detecting bending or flexing movements of the ER system's display. If the HMD becomes slightly bent, then the HMD's displays will have an offset relative to each other and relative to the user's face, thereby resulting in a display misalignment. The ER system can use its sensors to then determine what amount of compensation or correction to perform.

Different types of misalignments can have different ramifications for the user. For instance, horizontal misalignment refers to a scenario where the pixels of the displayed images are not rendered at the correct locations with respect to the user's pupils, thereby leading to various perceived depth errors on the part of the user. These depth errors can be quite problematic when the user is performing precision or accuracy-based tasks.

Vertical angular misalignment refers to a scenario where the optical axes of the displays are not in parallel but rather have a vertical, angular offset relative to one another. Vertical angular misalignments may occur due to flexing or bending of the HMD or for shifts to the HMD's hardware. Vertical angular misalignments often result in visual strain, visual discomfort, motion sickness, or, in extreme cases, the inability to fuse those images, leading to a lack of immersion because of the disruption in the three-dimensional (3D) experience.

For at least these various reasons, correcting both types of display misalignment is desirable for user comfort and quality. Although wearables are optimally aligned when they leave the factory, misalignment can be introduced during use because of the above-mentioned reasons. ER devices that have dedicated sensors (e.g., IMUs) are able to correct for these various binocular display misalignments; however, not all ER devices have such dedicated types of sensors. Thus, for systems that may not include these dedicated types of sensors, there is a substantial need to be able to correct for image misalignments.

The disclosed embodiments bring about numerous benefits, advantages, and practical applications to the technical field of ER technology. Notably, the disclosed embodiments are able to trigger a correction to a binocular image misalignment in an ER system, where this triggering is based on detected activity in the scene in which the ER system is operating. The corrections to these misalignments can occur quickly or slowly, thereby optimizing the correction algorithm for various objectives or conditions. As an example, the embodiments can beneficially perform corrective optimizations to achieve (i) an accurate performance or, alternatively, to achieve (ii) an uninterrupted performance. As used herein, the phrase "accurate performance" refers to a scenario where heightened priority and increased resources are provided during the correction process so that the correction can be performed in a fast manner, which may result in a sudden (but desired) jarring effect. As used herein, the phrase "uninterrupted performance" refers to a scenario where a lower priority and/or less resources are provided during the correction process so that the correction is performed slower, in a less jarring manner, and perhaps even as a background process.

To optimize for accurate (user) performance, the embodiments beneficially detect what activity is occurring in the scene, such as perhaps by employing hand tracking input as a means of understanding the context of the scene. If the user's hands are interacting with a hologram or if a determination that the user activity is intended for the hologram, then the embodiments may correct for any misalignment in a prioritized, quick manner. Prioritizing this correction, which results in the correction being performed rapidly, results in an accurate user performance.

As another example, if the hand tracking algorithm detects user input and interaction, the embodiments are able to automatically employ optimizing for accurate performance. The accurate performance correction algorithm includes fast corrections to one (or both) horizontal and vertical display misalignments because both of these types of misalignments can result in biases and inaccuracies in depth perception. Indeed, if the displays are horizontally misaligned by as little as approximately 5 milli-radians, the object will appear closer to the observer and thus also larger. If the observer desires highly precise depth cues (e.g., such as in a case where a surgeon is using the ER device for surgery), the correction algorithm will correct for anything at and above about 0.5 milli-radians, and the corrections are executed rapidly (e.g., 100 millisecond half-life). Thus, in this example scenario, when the user uses his/her hands for interaction, fast correction algorithms can be used so the user can accurately interact with the holograms.

On the other hand, when the input frequency of the scene activity (e.g., hand tracking) is below a threshold level or perhaps even is zero, the algorithm can be optimized to provide for uninterrupted performance. For instance, an assumption can be made that if the hand tracking input frequency is below the threshold, the user is not manipulating holograms and therefore the system can aim to provide an uninterrupted performance in order to achieve the best user experience. The uninterrupted performance correction algorithm can be configured to correct in a slow fashion (e.g., perhaps a 1 second half-life). In this scenario, it is likely the case that users will prefer to have uninterrupted experiences, such as when watching a movie. In this case, rapid correction would interrupt the user experience, thereby defeating the immersive nature of the experience that users are looking for. Thus, the correction algorithm can be configured to optimize for different user scenarios, user environments, or other conditions.

Today, ER devices do not use hand tracking input frequency as a means of selectively correcting for possible errors due to display misalignments for various types of user scenarios. The disclosed embodiments, on the other hand, do use that input mechanism as a trigger for determining when to correct misalignments. As a result, improved user comfort, improved immersive experience, and improved precision in performance can be selectively enhanced through the implementation of the disclosed correction algorithm. Accordingly, these and numerous other benefits will now be described in more detail throughout the remaining portions of this disclosure.

Example Architecture

Attention will now be directed to FIG. 1, which illustrates an example computing architecture 100. Architecture 100 includes a service 105, which can be implemented by an ER system 110 comprising an HMD. As used herein, the phrases ER system and HMD can be used interchangeably and generally refer to a type of system that allows a user to see various portions of the real world and that also displays virtualized content in the form of holograms. That ability means ER system 110 is able to provide so-called "passthrough images" to the user. It is typically the case that architecture 100 is implemented on an MR or AR system, though it can also be implemented in a VR system.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment. In some implementations, service 105 is a local service operating on a local device, such as the ER system 110. In some implementations, service 105 is a hybrid service that includes a cloud component operating in the cloud and a local component operating on a local device. These two components can communicate with one another.

Service 105 is generally tasked with triggering a correction to a binocular image misalignment (e.g., a horizontal image misalignment and/or a vertical angular image misalignment) in an ER system. This triggering is based on a detected activity (e.g., hand tracking, controller tracking, or other types of activity) in the scene in which the ER system is operating.

To do so, service 105 identifies one or more holograms in the scene, such as hologram 115. Hologram 115 is included as a part of an image 120 that is displayed on the ER system 110.

Figure 2:
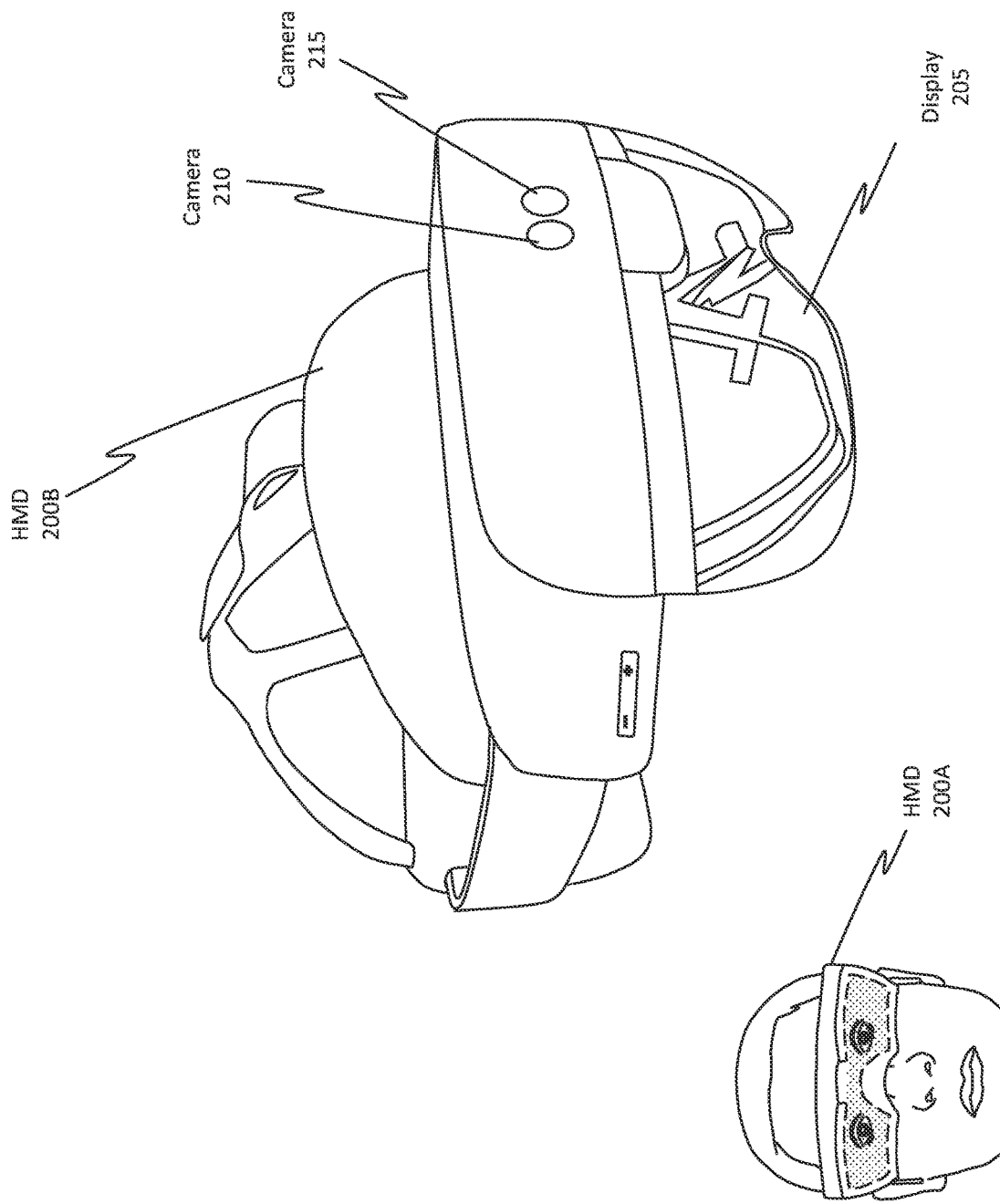
FIG. 2 illustrates an example of an HMD.

For example, FIG. 2 shows an example HMD 200A and 200B. HMD 200B includes a display 205 and multiple cameras, such as cameras 210 and 215. These cameras 210 and 215 are able to generate images of the environment or scene in which HMD 200B is operating. HMD 200B is then able to generate holograms and display those holograms in the display 205 based on the content identified in the images.

Figure 3:
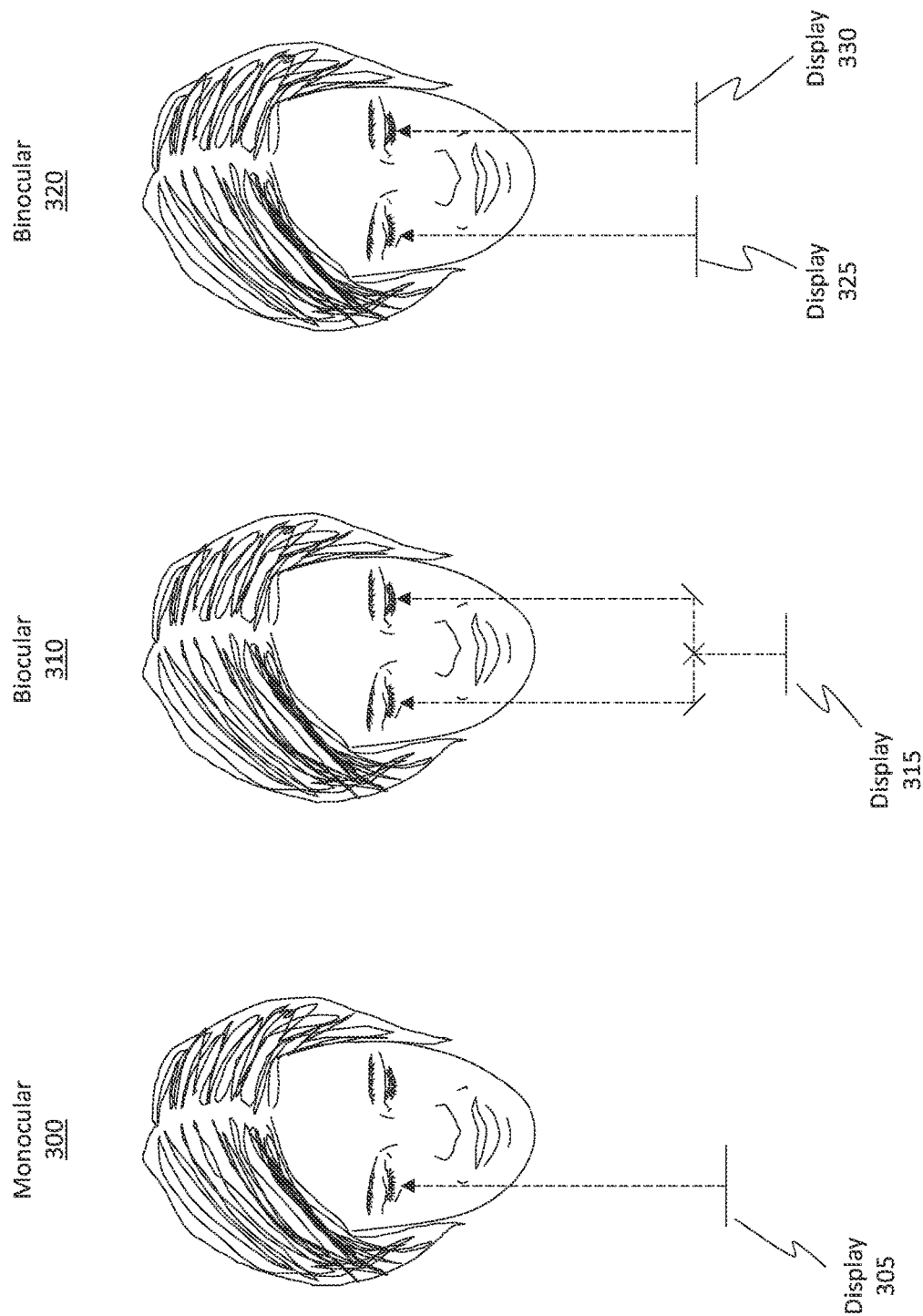
FIG. 3 illustrates different types of displays used by HMDs.

There are numerous different types of HMDs. For instance, FIG. 3 shows a monocular 300 type where a single image is displayed on a single display 305 and where that unit is provided for only a single eye of a user. FIG. 3 shows a biocular 310 type in which a single image is displayed on a display 315, but that image is delivered to both of the user's eyes.

FIG. 3 also shows a binocular 320 type in which the system includes two displays (e.g., display 325 and 330) and a different image is displayed in each of those displays. The binocular image misalignment occurs when the binocular 320 type of HMD is used.

Returning to FIG. 1, to determine when to trigger a correction event, service 105 monitors the scene to detect whether a user activity 125 is being performed with respect to one or more of the holograms (e.g., hologram 115). Service 105 may also determine that a binocular image misalignment 130 has occurred, where that binocular image misalignment 130 includes one or both of a horizontal image misalignment or a vertical angular image misalignment.

Service 105 may determine that this misalignment has occurred based on a variety of factors. For instance, service 105 may determine that the misalignment has occurred based on a time period since a last correction event has occurred, based on an amount of usage the HMD has had, based on an amount of movement the HMD has undergone (e.g., perhaps using other IMUs on the HMD), based on a time period since a factory calibration, or perhaps based on user input indicating that a misalignment has happened.

If activity 125 is detected, service 105 may trigger an optimization algorithm 135 to trigger the system to correct the misalignment. This optimization algorithm 135 may include a correction algorithm to achieve an accurate performance 140 or a correction algorithm to achieve uninterrupted performance 145, as discussed earlier.

Regarding activity 125, activity 125 may include any type of activity or even the lack of activity. For instance, in one scenario, activity 125 includes a user's hand or other body part movement with respect to a hologram. For example, activity 125 may include any type of interaction the user is having with respect to a hologram. Activity 125 may include any type of presumptive interaction the user will likely have with respect to the hologram as well.

For instance, suppose a hologram is displayed in an upper region of the user's field of view (FOV). The ER system may detect the user's hand approaching that hologram. Even though the user's hand has not yet contacted or interacted with the hologram, the embodiments are able to presume that the user is about to interact with the hologram, and this presumption is sufficient to qualify as a triggering event to trigger the correction. Thus, even if a user has not yet contacted a hologram, the user's action may still be a qualifying, triggering event.

Activity 125 may include an activity in which a user is using a controller to engage or interact with a hologram. For example, suppose the user is holding a controller and is using the controller to interact with the hologram. This type of activity is also a qualifying, triggering activity that may trigger the corrective action. As another example of an activity, a user may be interacting with a trackpad or other illustrative pad, touchscreen, touch pad, or any other medium indicative of an intention to interact with a hologram.

In some embodiments, other activities, even hand movements, may not qualify as triggering events if those activities are not performed with respect to a hologram or an object with which a hologram has a relationship. For instance, suppose a hologram is displayed in the righthand side of the user's FOV. If user activity is detected in the lefthand side of the user's FOV and if that activity is determined to not be directed or otherwise associated with the hologram, then the embodiments may refrain from triggering a correction event. Accordingly, various different types of activities may trigger the correction event, and the embodiments are able to intelligently determine whether an activity is sufficient to trigger that correction.

Figure 4:
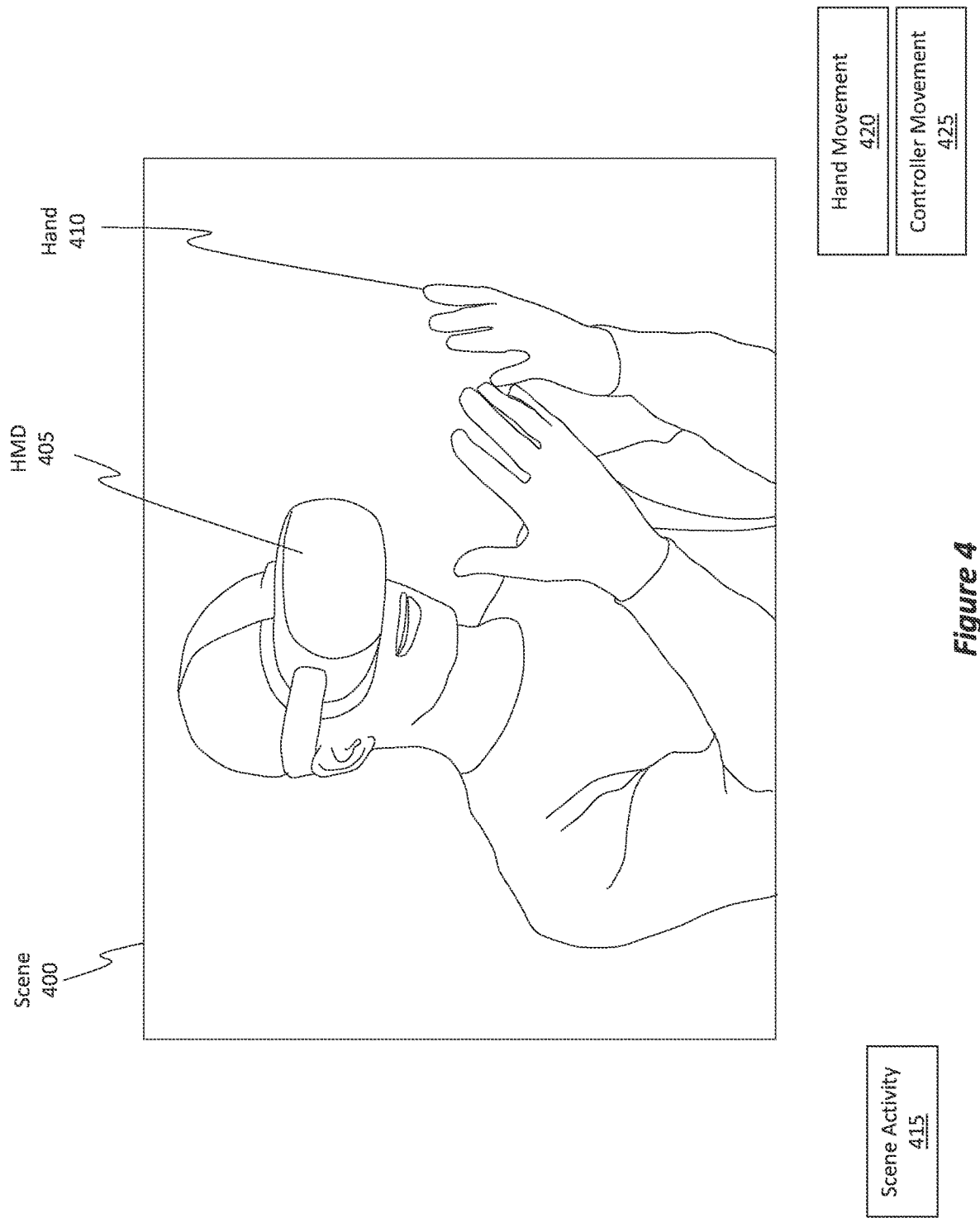
FIG. 4 illustrates an example of a scene in which a user is wearing an HMD.

FIG. 4 shows an example scene 400 in which a user is wearing an HMD 405. Currently, the user's hands (e.g., hand 410) are visible in the user's FOV. In this example scenario, HMD 405 is tracking the scene activity 415 to determine when and how to correct for a condition involving binocular image misalignment. Scene activity 415 may include a hand movement 420 or even a controller movement 425, as mentioned previously.

Figure 5:
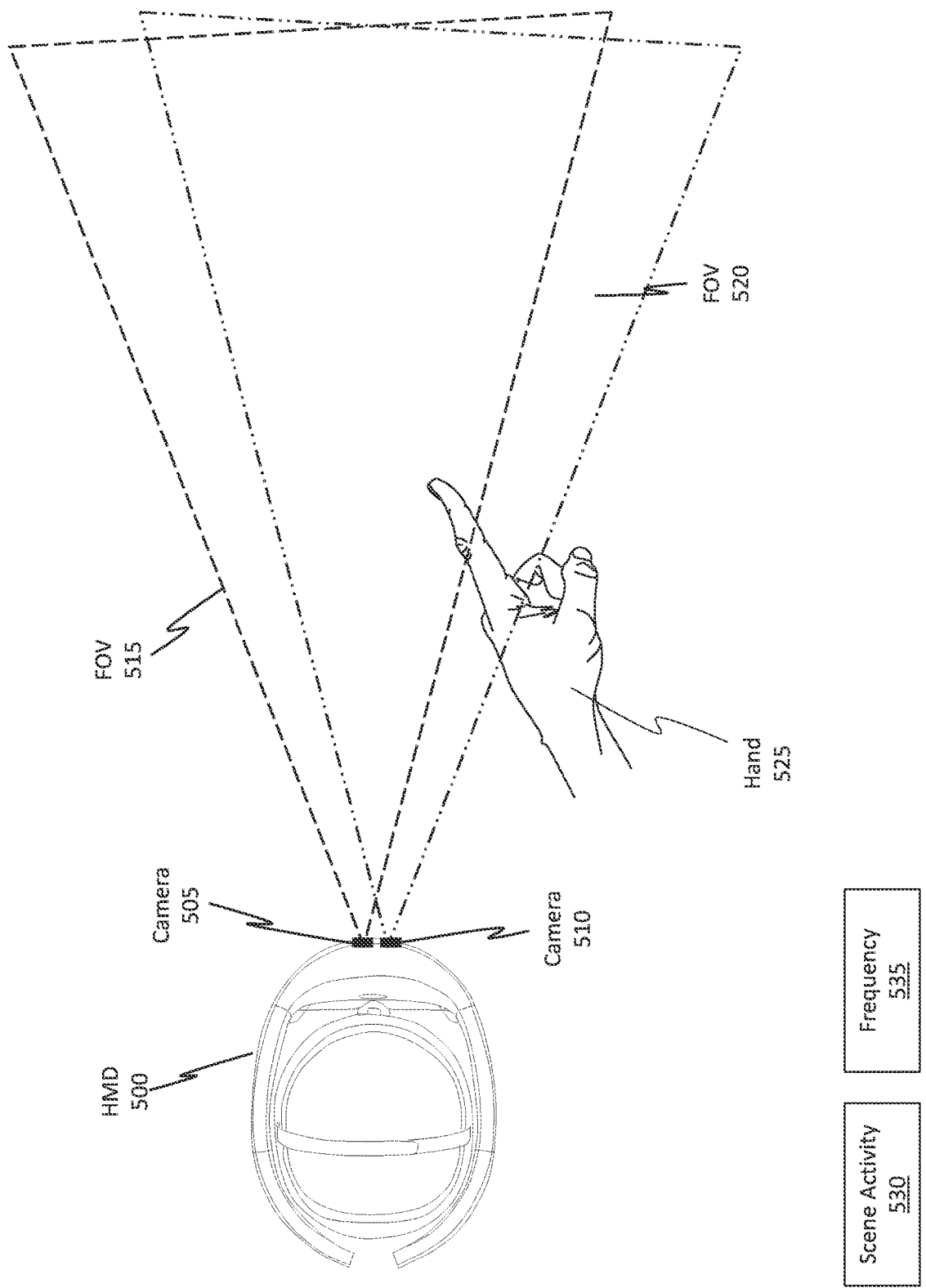
FIG. 5 illustrates an example of activity that is performed within the fields of view of HMD cameras.

FIG. 5 shows an HMD 500 that includes multiple cameras, including cameras 505 and 510. Camera 505 has a FOV 515, and camera 510 has a FOV 520. The cameras 505 and 510 are able to track a user's hand 525 when it enters the FOVs 515 and/or 520. This hand movement is one example of detected scene activity 530.

In some implementations, the embodiments also track the frequency 535 or the rate of movement of the user's hand or body part. For instance, if the frequency 535 of the movement is below a frequency threshold, then the embodiments may determine that uninterrupted performance is desired. On the other hand, if the movement is above the frequency threshold, then the embodiments may determine that accurate performance is desired. In some cases, the embodiments may determine that the user's movement is a pathological user response and may elect to provide uninterrupted performance.

Figure 6:
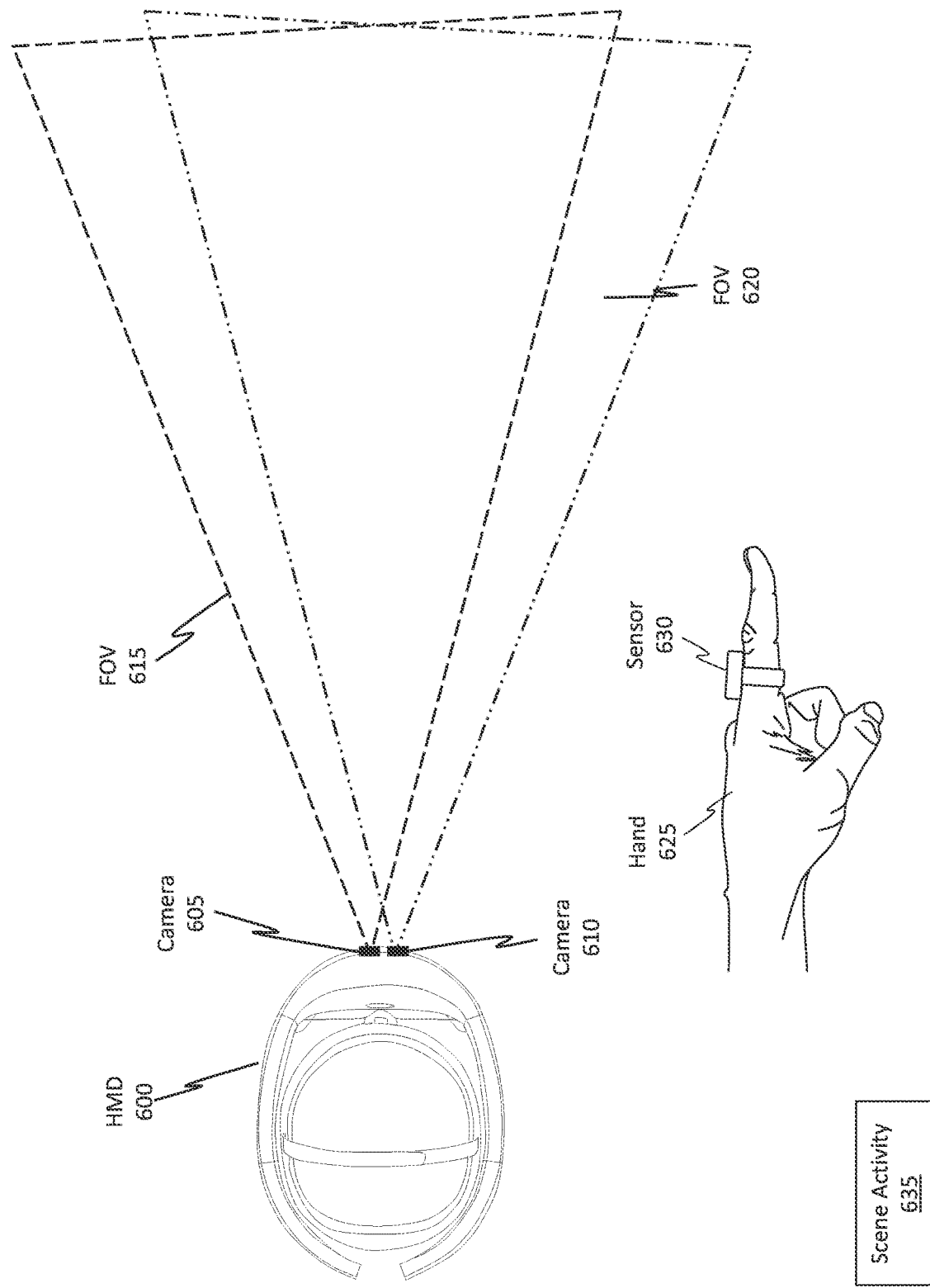
FIG. 6 illustrates an example of activity that is performed outside of the fields of view of the HMD cameras.

FIG. 6 shows an example HMD 600, with cameras 605 and 610 having FOVs 615 and 620, respectively. FIG. 6 also shows the user's hand 625 with a sensor 630 attached thereon. Notice, hand 625 and sensor 630 are both outside of the FOVs of the cameras 605 and 610. Despite not currently being in the view of the FOVs 615 and 620, the embodiments can still track the movements of the sensor 630 and determine whether such movements are made or are intended to be made with respect to a hologram. If those movements are determined to be intended to be made with respect to the hologram, then the embodiments may trigger the corrective action. On the other hand, if the movements are determined to not be intended to be made with respect to the hologram, then the embodiments may elect for the uninterrupted performance aspect. Thus, as shown in FIG. 6, some scene activity 635 may be detected even when it is performed outside of the FOVs of the HMD's cameras. Such activity can also operate as a triggering instance for determining when and how to correct a misalignment condition.

As mentioned previously, the speed at which the correction may occur is set to a relatively fast speed. For instance, the correction can be performed in a manner so that its half-life is about 100 milliseconds. In some cases, the entire duration of the process is less than 1 second (e.g., perhaps anywhere from about 0.2 seconds to about 1.0 seconds). In some implementations, the correction algorithm to achieve accurate performance is provided a high or heightened priority level with respect to processor usage, thus, the correction can be elevated over other tasks performed by the processors.

Figure 7:
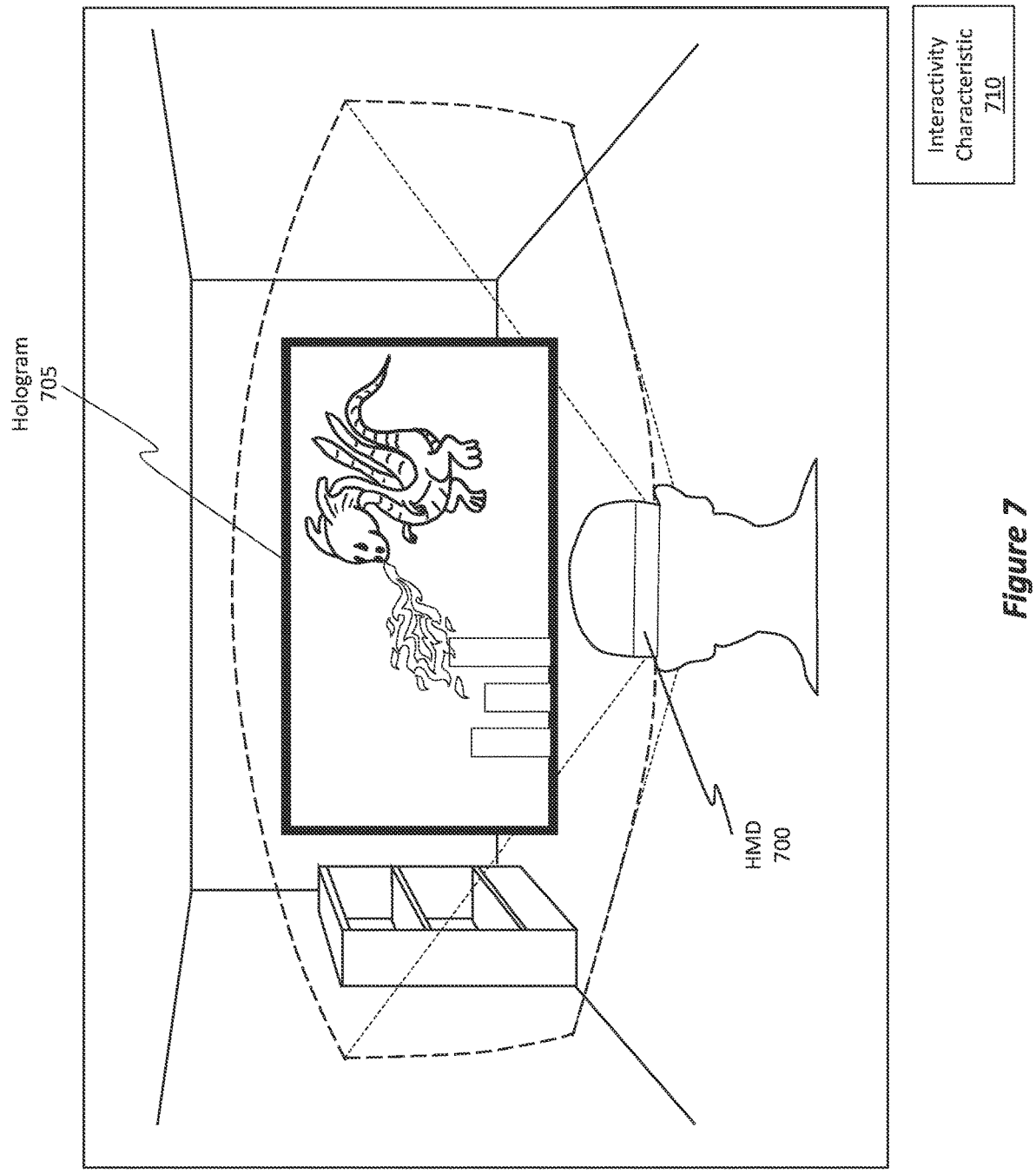
FIG. 7 illustrates a scene that includes a hologram.

FIGS. 5 and 6 show example scenarios in which various activities in a scene are detected. This detection can occur through visual means or non-visual means. Those activities were determined to be related to a hologram and thus trigger a correction operation to correct for any misalignments. FIG. 7, on the other hand, illustrates a scenario where uninterrupted performance is desired.

FIG. 7 shows a user wearing an HMD 700. HMD 700 is currently rendering a hologram 705 in the form of a movie. Although the movie is interactable by the user (e.g., starting, stopping, fast forwarding, etc.), this movie hologram is designed to primarily just be watched by the user. Stated differently, hologram 705 has certain interactivity characteristics 710, and these characteristics are such that it is anticipated that minimal activity will likely occur with respect to hologram 705. Based on that anticipation, the embodiments can elect to provide an uninterrupted experience instead of performing the accurate performance correction.

As mentioned, the correction algorithm to achieve uninterrupted performance is relatively slower as compared to the correction algorithm to achieve accurate performance. For instance, the uninterrupted performance algorithm has a half-life completion time of about 1 second. In some scenarios, the entire process may take about 3-5 seconds to complete. Generally, the priority level of this correction technique is not elevated, as in the case of the accurate performance algorithm.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
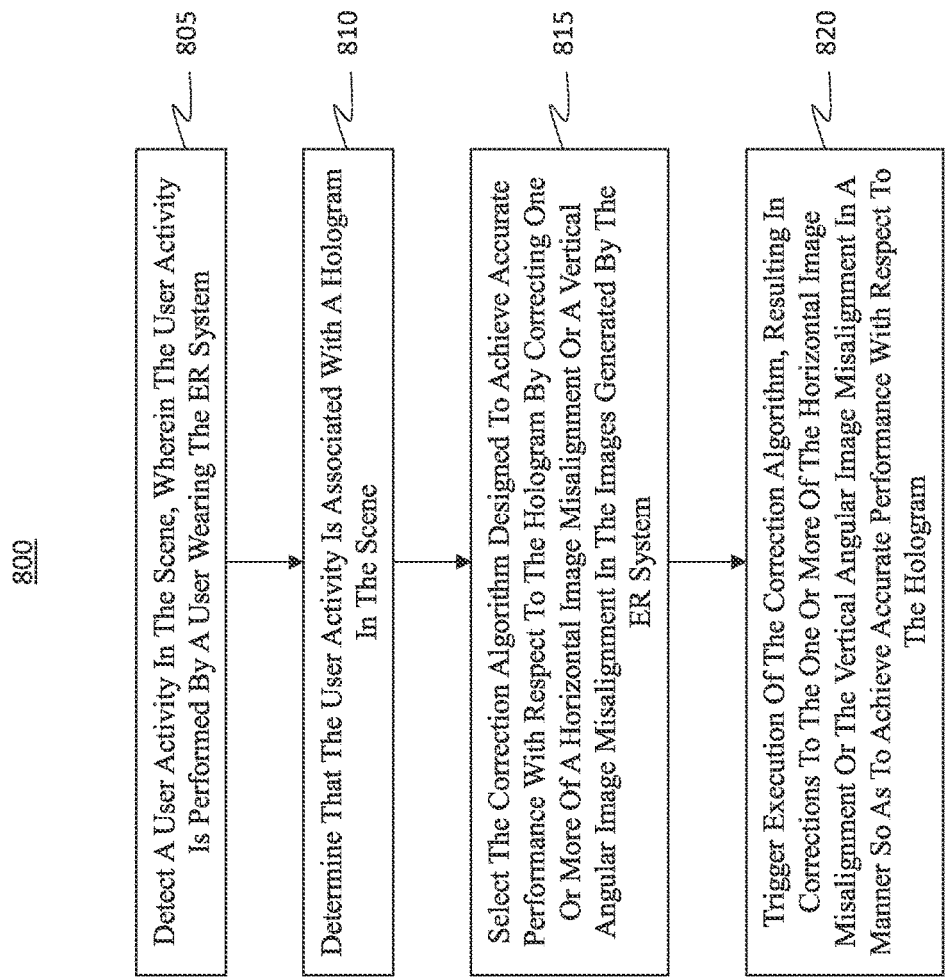
FIGS. 8, 9, 10A, and 10B illustrate various flowcharts of example methods for triggering the performance of a correction algorithm.

Attention will now be directed to FIG. 8, which illustrates a flowchart of an example method 800 for triggering execution of a correction algorithm designed to achieve accurate performance with respect to a hologram by correcting a binocular image misalignment in images of an extended reality (ER) system. This triggering is based on detected activity in a scene in which the ER system is operating. Method 800 may be implemented by service 105 of FIG. 1. More generally, method 800 may be implemented by ER system 110 of FIG. 1.

Method 800 includes an act (act 805) of detecting a user activity in the scene. The user activity is performed by a user wearing the ER system. In some cases, the user activity is a hand movement of the user. In other cases, the user activity is a movement of a controller, touchpad, or touchscreen used by the user. In yet other cases, the user activity can be a combination of a hand movement, a controller movement, and/or some other movement. The movement can be a movement of a different body part as well, such as the user's head, torso, or even legs. That is, the user activity can include other bodily part movements of the user. Optionally, the user activity can include a gaze direction of the user or even speech uttered by the user.

In some implementations, the user activity is detected within a FOV of a camera of the ER system. In other implementations, the user activity is determined to be occurring outside of the FOV of the camera. In yet other implementations, the user activity may initially start in the camera's FOV but then leave the FOV. Despite being outside of the FOV, the embodiments may still determine that the user activity is still directed or intended to be directed to the hologram. Consequently, the embodiments may trigger the accurate performance correction. Relatedly, the user activity may initially start outside of the camera's FOV and then enter the FOV. Despite initially being outside of the FOV, the embodiments can still trigger the corrective action. As one example, the user activity may be a movement of a controller used by the user, and the movement may be determined to be occurring outside of the camera's FOV.

Act 810 includes determining that the user activity is associated with a hologram in the scene. This determination may be based on a variety of factors. As a first example, the embodiments may determine the interactivity characteristics of the hologram. If the hologram is one that is designed to be heavily interacted with by the user (e.g., such as perhaps a button, toggle, or other interactive hologram), then there is a higher likelihood that user activity will be performed with respect to that hologram. On the other hand, if the hologram is one that is designed primarily for viewing purposes (e.g., perhaps a movie), then there is a lower likelihood that user activity will be performed with respect to that hologram.

As another example, the intention may be based on the foveal view or center of focus of the user's gaze or display. If the user's HMD is directed substantially directly at the hologram and if an activity is detected, then an inference can be made that the activity will likely be directed to the hologram. On the other hand, if the hologram is in the user's peripheral view or is even partially outside of the user's FOV, then an inference can be made that the activity will likely not be directed to the hologram.

As another example, past user behavior can be considered when determining whether user activity is directed or targeted to a hologram. The embodiments are able to monitor a user's behavior over time to detect trends or patterns as to how the user interacts with holograms. If the embodiments detect a similar pattern or trend commencing, then the embodiments can infer that such activity is directed to the hologram.

As yet another example, the behavior of the hologram can be considered. For instance, if the hologram is incentivizing or otherwise asking for a response from the user, then that behavior can be considered when determining whether the user's activity is likely to be directed to the hologram.

Accordingly, in some implementations, determining that the user activity is associated with the hologram in the scene is based on a detected movement of a hand of the user, where the user's hand is detected as approaching the hologram. In some implementations, determining that the user activity is associated with the hologram in the scene is based on a detected movement of a hand of the user, where the user's hand is engaging with the hologram in the scene. Determining that the user activity is associated with the hologram in the scene may also be based on a stimuli that is detected outside of a field of view of a camera on the ER system. That stimuli can be any real world object and/or any hologram. That stimuli can be an environmental condition or even another human or machine. Accordingly, these and various other factors can be used to determine whether an activity is likely intended for the hologram.

Based on the determination that the user activity is associated with the hologram, act 815 includes selecting a correction algorithm designed to achieve accurate performance with respect to the hologram by correcting one or more of a horizontal image misalignment or a vertical angular image misalignment in images generated by the ER system. In this scenario, the correction algorithm is provided with higher priority and/or with a higher level of resource usage availability in order to perform the corrections in a fast manner.

Act 820 includes triggering execution of the correction algorithm, resulting in correcting to the one or more of the horizontal image misalignment or the vertical angular image misalignment. In some implementations, corrections to both the horizontal image misalignment and the vertical angular image misalignment are performed.

Method 800 may include additional acts that occur subsequent to act 820 or perhaps prior to the commencement of act 805. For instance, method 800 may include an act of detecting no user activity, or at least an amount of user activity that is below a threshold level. In response to this detection, the embodiments may determine that the correction algorithm for achieving uninterrupted performance is to be performed. Thus, corrections to one or both of the vertical angular image misalignment and the horizontal image misalignment may be performed, but these corrections are performed in a much slower manner designed to not impede, interfere, or otherwise disrupt the user's experience. Thus, the embodiments are able to correct for any type of binocular display misalignment. The embodiments are further able to determine which correction algorithm to use based on detected activity in the scene. If a threshold amount of activity is detected, then the embodiments may correct the binocular image misalignment in a rapid manner, which is referred to as the accurate performance technique. On the other hand, if the activity is less than the threshold amount, then the embodiments may correct the binocular image misalignment in a slower manner, which is referred to as the uninterrupted performance technique. Thus, the methods disclosed herein intelligently select which technique to use, but both of those techniques involve corrections to horizontal and vertical image misalignments.

Figure 9:
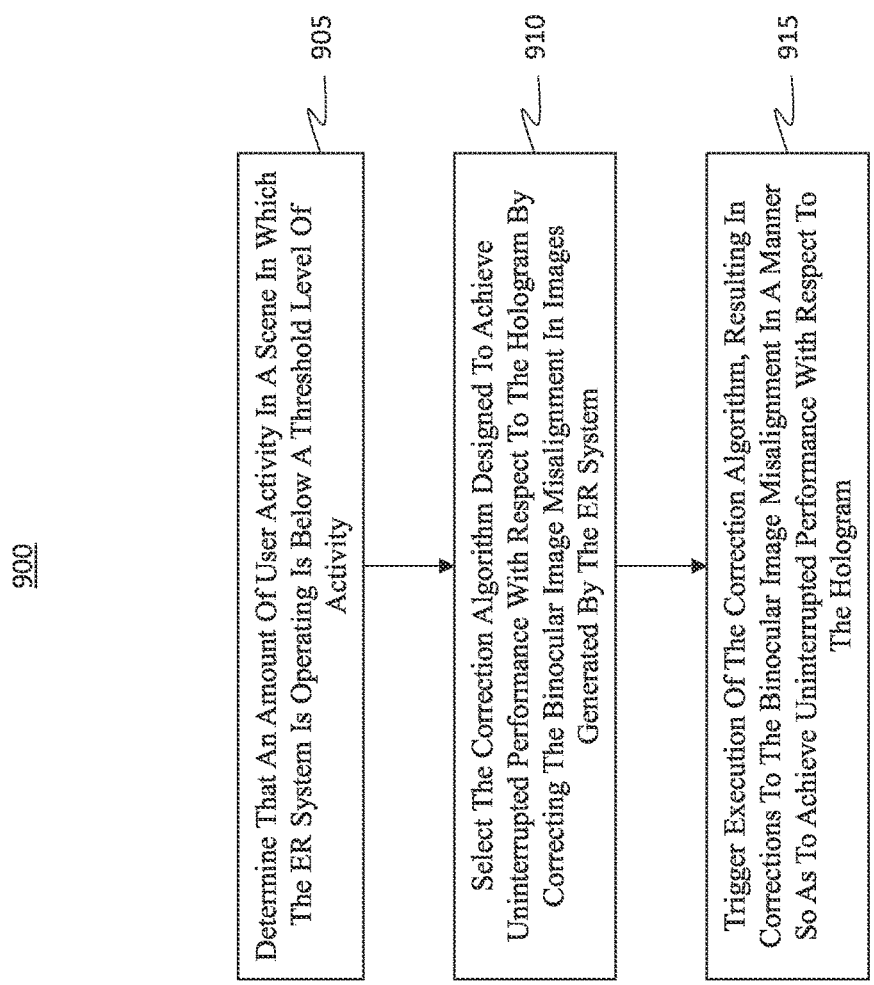

Attention will now be directed to FIG. 9, which illustrates another flowchart of an example method 900 for triggering execution of a correction algorithm designed to achieve uninterrupted performance with respect to a hologram by correcting a binocular image misalignment in the ER system. Method 900 can also be implemented by service 105 of FIG. 1 and/or ER system 110.

Method 900 includes an act (act 905) of determining that an amount of user activity in a scene in which the ER system is operating is below a threshold level of activity. In some cases, determining that the amount of user activity in the scene is below the threshold level of activity includes determining that a frequency by which the user activity is occurring is below a frequency threshold. For instance, consider a movement of the user's hand. If the movement frequency is low, such as perhaps an infrequent movement or twitch of the user's hand, then that movement likely is not intended or directed to the hologram. On the other hand, if there are substantial movements of the user's hand (thus a high frequency), then those movements may be determined to be directed to the hologram.

Act 910 includes selecting the correction algorithm designed to achieve uninterrupted performance with respect to the hologram by correcting the binocular image misalignment in images generated by the ER system. The binocular image misalignment may include one or more of a horizontal image misalignment or a vertical angular image misalignment. In some implementations, the process of selecting the correction algorithm designed to achieve uninterrupted performance with respect to the hologram is further based on an interactivity characteristic of the hologram.

Act 915 includes triggering execution of the correction algorithm, resulting in corrections to the binocular image misalignment in a manner so as to achieve uninterrupted performance with respect to the hologram. Thus, corrections to vertical and/or horizontal misalignments can be performed.

Figure 10A:
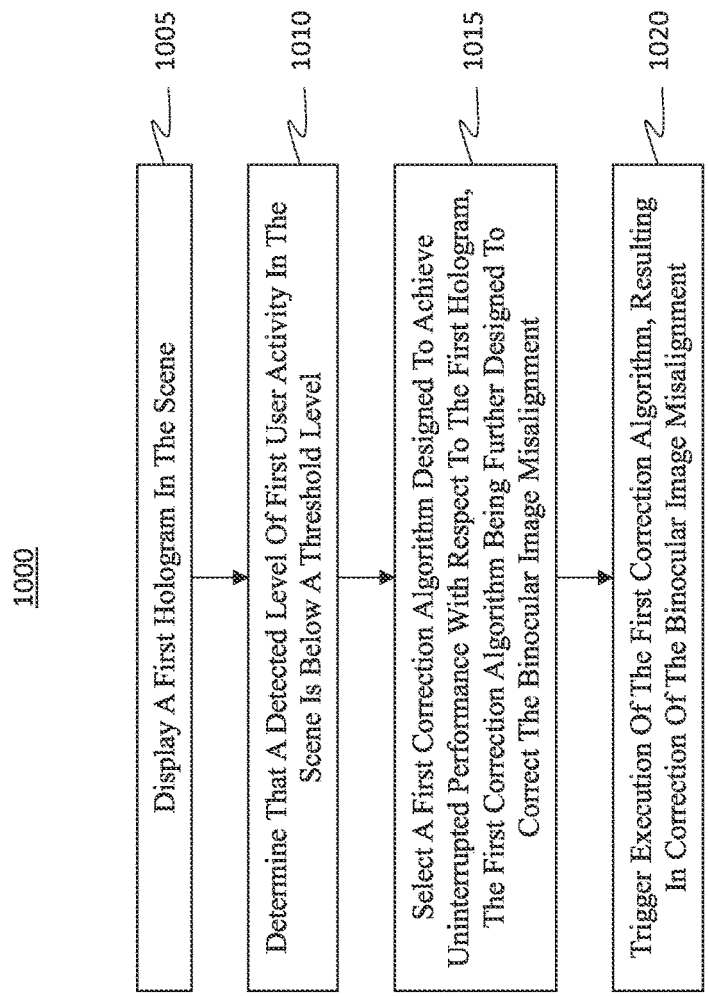
Figure 10B:
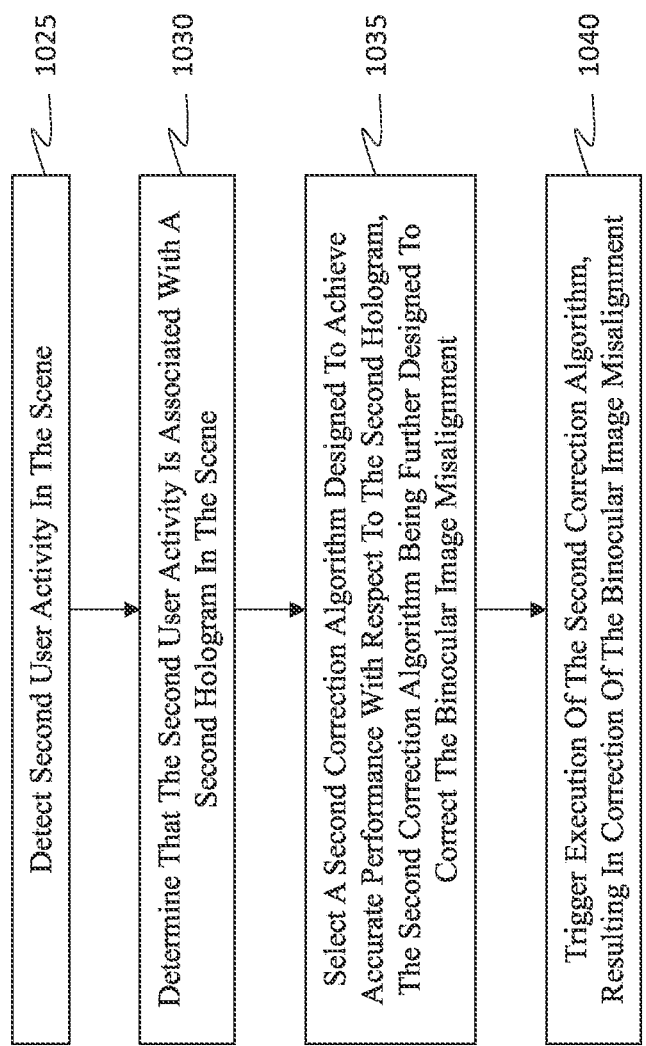

FIGS. 10A and 10B illustrate other flowcharts of an example method 1000 for triggering a correction to a binocular image misalignment in an extended reality (ER) system. Method 1000 may also be implemented by the disclosed services and ER systems.

Method 1000 includes an act (act 1005) of displaying a first hologram in the scene. The hologram may be of any type.

Act 1010 includes determining that a detected level of first user activity in the scene is below a threshold level. The first user activity is performed by a user wearing the ER system, and that user activity may involve any type.

Act 1015 includes selecting a first correction algorithm designed to achieve uninterrupted performance with respect to the first hologram. Notably, the first correction algorithm is further designed to correct the binocular image misalignment. In some cases, images generated by the ER system have a horizontal image misalignment in which the images are horizontally misaligned by 5 milli-radians or more. The correction algorithm is designed to correct for such misalignments.

Act 1020 includes triggering execution of the first correction algorithm. Execution of this algorithm results in correction of the binocular image misalignment. In some embodiments, performing the first correction algorithm is performed with a half-life duration between about 0.5 seconds and about 1.5 seconds.

Method 1000 continues in FIG. 10B. Method 1000 includes an act (act 1025) of subsequently detecting second user activity in the scene.

Act 1030 includes determining that the second user activity is associated with a second hologram in the scene. This user activity can be of any type.

Based on the determination that the second user activity is associated with the second hologram, act 1035 includes selecting a second correction algorithm designed to achieve accurate performance with respect to the second hologram. Notably, the second correction algorithm is further designed to correct the binocular image misalignment.

Act 1040 includes triggering execution of the second correction algorithm. Such an action results in correction of the binocular image misalignment. Performing the second correction algorithm is performed with a half-life duration between about 80 milliseconds and 120 milliseconds.

Example Computer/Computer Systems

Figure 11:
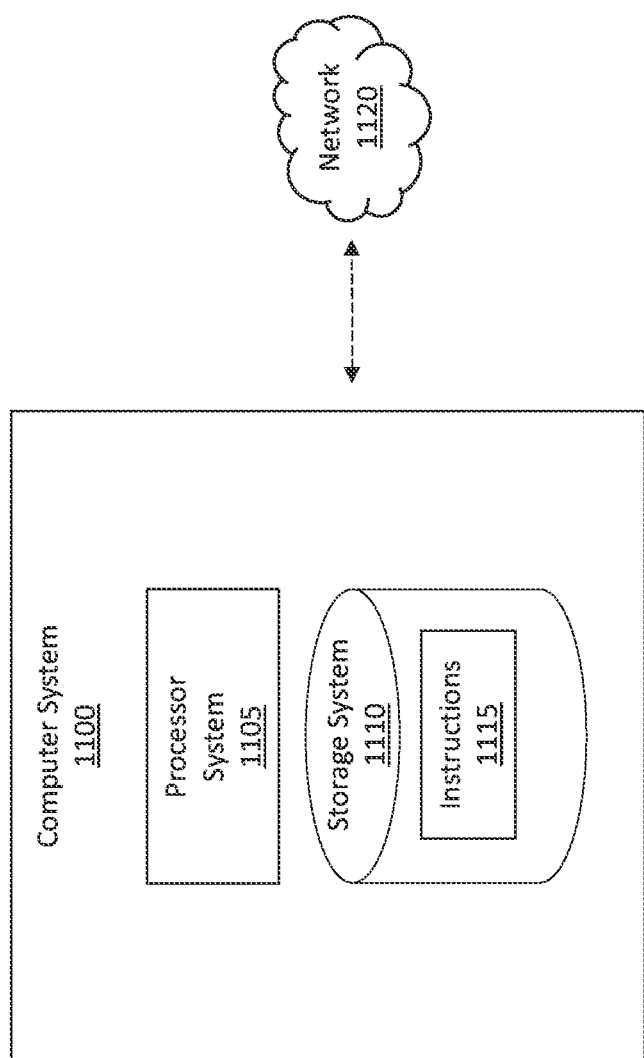
FIG. 11 illustrates an example computer system that can be configured to perform any of the disclosed operations.

Attention will now be directed to FIG. 11 which illustrates an example computer system 1100 that may include and/or be used to perform any of the operations described herein. Computer system 1100 may take various different forms. For example, computer system 1100 may be embodied as a tablet, a desktop, a laptop, a mobile device, or a standalone device, such as those described throughout this disclosure. Computer system 1100 may also be a distributed system that includes one or more connected computing components/devices that are in communication with computer system 1100.

In its most basic configuration, computer system 1100 includes various different components. FIG. 11 shows that computer system 1100 includes a processor system 1105 that includes one or more processor(s) (aka a "hardware processing unit") and a storage system 1110.

Regarding the processor(s) of the processor system 1105, it will be appreciated that the functionality described herein can be performed, at least in part, by one or more hardware logic components (e.g., the processors). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage system 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage system 1110 is shown as including executable instructions 1115. The executable instructions 1115 represent instructions that are executable by the processor(s) of the processor system 1105 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An extended reality (ER) system that triggers execution of a correction algorithm designed to achieve uninterrupted performance with respect to a hologram by correcting a binocular image misalignment in the ER system, said ER system comprising:
   a processor system; and
   a storage system that stores instructions that are executable by the processor system to cause the ER system to:
      determine that an amount of user activity in a scene in which the ER system is operating is below a threshold level of activity;
      select the correction algorithm designed to achieve uninterrupted performance with respect to the hologram by correcting the binocular image misalignment in images generated by the ER system; and
      trigger execution of the correction algorithm, resulting in corrections to the binocular image misalignment in a manner so as to achieve uninterrupted performance with respect to the hologram.

2. The ER system of claim 1, wherein the binocular image misalignment includes a horizontal image misalignment.

3. The ER system of claim 1, wherein the binocular image misalignment includes a vertical angular image misalignment.

4. The ER system of claim 1, wherein the binocular image misalignment includes at least one of a horizontal image misalignment or a vertical angular image misalignment.

5. The ER system of claim 1, wherein determining that the amount of user activity in the scene is below the threshold level of activity includes determining that a frequency by which the user activity is occurring is below a frequency threshold.

6. The ER system of claim 1, wherein selecting the correction algorithm designed to achieve uninterrupted performance with respect to the hologram is further based on an interactivity characteristic of the hologram.

7. A method for triggering a correction to a binocular image misalignment in an extended reality (ER) system, said method comprising:
displaying a first hologram in a scene;
determining that a detected level of first user activity in the scene is below a threshold level, wherein the first user activity is performed by a user wearing the ER system;
selecting a first correction algorithm designed to achieve uninterrupted performance with respect to the first hologram, the first correction algorithm being further designed to correct the binocular image misalignment;
triggering execution of the first correction algorithm, resulting in correction of the binocular image misalignment;
subsequently, detecting second user activity in the scene;
determining that the second user activity is associated with a second hologram in the scene;
based on said determination that the second user activity is associated with the second hologram, selecting a second correction algorithm designed to achieve accurate performance with respect to the second hologram, the second correction algorithm being further designed to correct the binocular image misalignment; and
triggering execution of the second correction algorithm, resulting in correction of the binocular image misalignment.

8. The method of claim 7, wherein performing the first correction algorithm is performed with a half-life duration between about 0.5 seconds and about 1.5 seconds.

9. The method of claim 7, wherein images generated by the ER system have a horizontal image misalignment in which the images are horizontally misaligned by 5 milliradians or more.

10. The method of claim 7, wherein performing the second correction algorithm is performed with a half-life duration between about 80 milliseconds and 120 milliseconds.

11. A computer system that triggers execution of a correction algorithm designed to achieve uninterrupted performance with respect to a hologram by correcting a binocular image misalignment in the computer system, said computer system comprising:
a processor system; and
a storage system that stores instructions that are executable by the processor system to cause the computer system to:
determine that an amount of user activity in a scene in which the computer system is operating is below a threshold level of activity;
select the correction algorithm designed to achieve uninterrupted performance with respect to the hologram by correcting the binocular image misalignment in images generated by the computer system; and
trigger execution of the correction algorithm, resulting in corrections to the binocular image misalignment in a manner so as to achieve uninterrupted performance with respect to the hologram.

12. The computer system of claim 11, wherein the user activity is a hand movement of the user.

13. The computer system of claim 11, wherein the user activity is a movement of a controller used by the user.

14. The computer system of claim 11, wherein the user activity is detected within a field of view of a camera of the computer system.

15. The computer system of claim 11, wherein the user activity is determined to be occurring outside of a field of view of a camera on the computer system.

16. The computer system of claim 11, wherein the user activity is a movement of a controller used by the user, and wherein the movement is determined to be occurring outside of a field of view of a camera on the computer system.

17. The computer system of claim 11, wherein the user activity is determined to be associated with the hologram in the scene based on a detected movement of a hand of the user, where the user's hand is detected as approaching the hologram.

18. The computer system of claim 11, wherein the user activity is determined to be associated with the hologram in the scene based on a detected movement of a hand of the user, where the user's hand is engaging with the hologram in the scene.

19. The computer system of claim 11, wherein the binocular image misalignment includes one of: a horizontal image misalignment or a vertical angular image misalignment.

20. The computer system of claim 11, wherein determining that the amount of user activity in the scene is below the threshold level of activity includes determining that a frequency by which the user activity is occurring is below a frequency threshold.

* * * * *